United States Patent
Ishikawa et al.

(10) Patent No.: US 6,805,497 B1
(45) Date of Patent: Oct. 19, 2004

(54) OPTICAL TRANSMISSION LINE

(75) Inventors: Shinji Ishikawa, Yokohama (JP);
Motonori Nakamura, Yokohama (JP);
Masao Tsukitani, Yokohama (JP);
Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 46 days.

(21) Appl. No.: 09/869,698

(22) PCT Filed: Nov. 2, 2000

(86) PCT No.: PCT/JP00/07747

§ 371 (c)(1),
(2), (4) Date: Jul. 3, 2001

(87) PCT Pub. No.: WO01/33266

PCT Pub. Date: May 10, 2001

(30) Foreign Application Priority Data

Nov. 4, 1999 (JP) .......................... P11-313803

(51) Int. Cl.$^7$ .............................................. G02B 6/255
(52) U.S. Cl. ......................................................... 385/96
(58) Field of Search ............................. 385/96, 97, 98, 385/27, 28, 123

(56) References Cited

U.S. PATENT DOCUMENTS

| 5,555,340 A | 9/1996 | Onishi et al. ................ 385/127 |
| 5,710,850 A | 1/1998 | Watanabe et al. ............. 385/71 |
| 6,362,249 B2 * | 3/2002 | Chawla ....................... 522/182 |

FOREIGN PATENT DOCUMENTS

| JP | 57-024906 | 2/1982 |
| JP | 03-130705 | 6/1991 |
| JP | 08-201642 | 8/1996 |

* cited by examiner

Primary Examiner—Javaid H. Nasri
(74) Attorney, Agent, or Firm—McDermott Will & Emery LLP

(57) ABSTRACT

An optical transmission line including a portion formed by fusion-splicing optical fibers having structures different from each other; wherein, in the optical fibers having structures different from each other, a first optical fiber 1 has a mode field diameter smaller than that of a second optical fiber 2 fusion-spliced thereto; and wherein the first optical fiber 1 has an average viscosity from a center to an outermost layer greater than that of the second optical fiber from a center to an outermost layer.

11 Claims, 9 Drawing Sheets

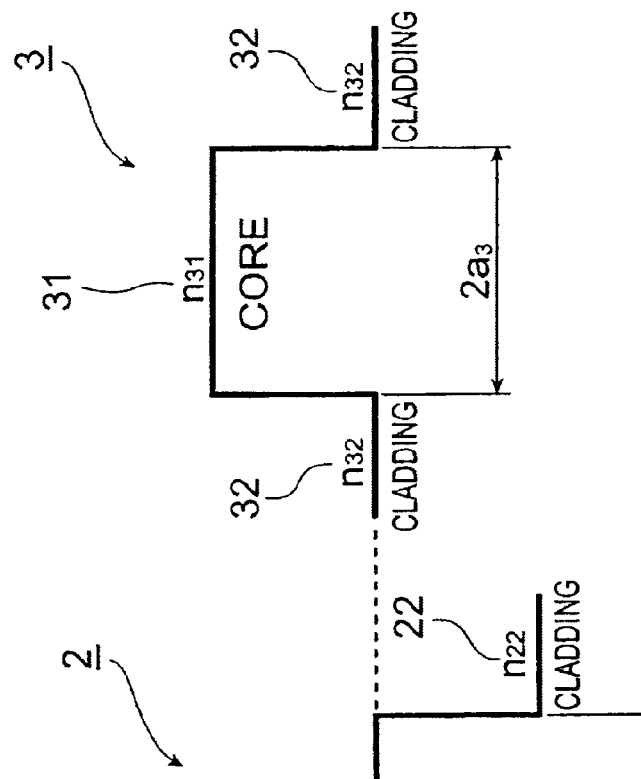
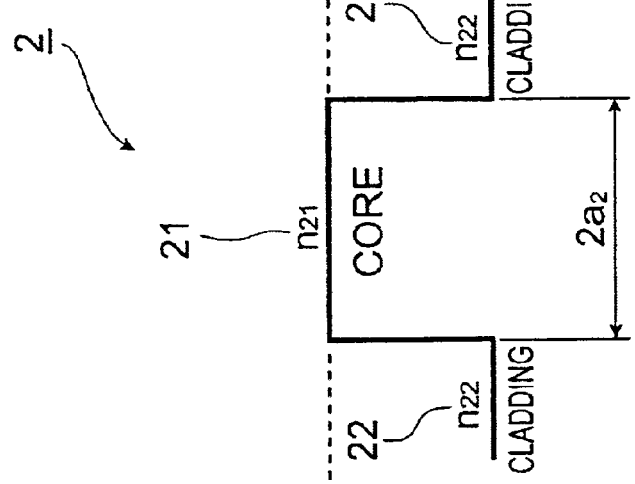
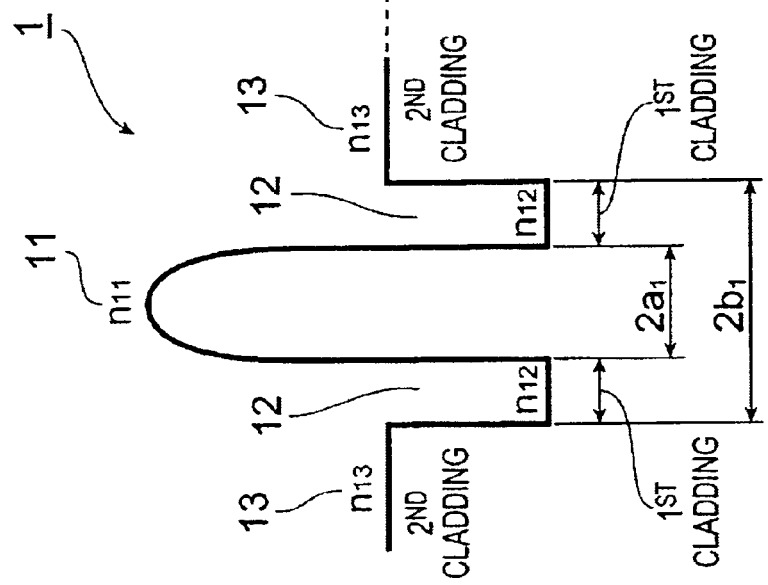

OPTICAL TRANSMISSION LINE

TECHNICAL FIELD

The present invention relates to an optical transmission line composed of fusion-splicing optical fibers which have different structures each other; and, in particular, to an optical transmission line including a portion in which optical fibers having mode field diameters different from each other are fusion-spliced.

BACKGROUND ART

Optical fibers are connected together by fusion splice, which enables a permanent connection, in order to restrain the splice loss at their splice portion from fluctuating. However, the splice loss at the fusion-splice portion is greater when optical fibers having structures different from each other are fusion-spliced together than when optical fibers having the same structure are fusion-spliced together.

For example, there is a case where a dispersion-compensating optical fiber having a negative chromatic dispersion at a wavelength of 1.55 $\mu$m is fusion-spliced to a standard single-mode optical fiber having a zero-dispersion wavelength in a 1.3-$\mu$m wavelength band and a positive chromatic dispersion at a wavelength of 1.55 $\mu$m, so as to carry out dispersion compensation. The single-mode optical fiber and dispersion-compensating optical fiber greatly differ from each other in terms of their fiber structures. Therefore, the splice loss at their fusion-splice portion is about 1.0 to 2.0 dB, which is large.

Constructing an optical transmission line by alternately fusion-splice positive and negative dispersion optical fibers respectively having positive and negative chromatic dispersions at a predetermined wavelength, for example, has also been under consideration. Constructing an optical transmission line as such yields a predetermined value of chromatic dispersion or higher at each point on the optical transmission line, so as to restrain transmission characteristics from deteriorating due to four-wave mixing, and lowers the average chromatic dispersion of the optical transmission line as a whole, so as to restrain transmission characteristics from deteriorating due to the chromatic dispersion. In this case, for example, the positive dispersion optical fiber has a step-index type refractive index profile with a core diameter of 8 $\mu$m and a refractive index difference of 0.35%, whereas the negative dispersion optical fiber has a W type refractive index profile, whereby their fiber structures greatly differ from each other. Therefore, the splice loss at their fusion-splice portion is about 0.8 to 1.5 dB, which is large.

Optical fiber connecting methods for eliminating such problems are disclosed in Japanese Patent Application Laid-Open No. HEI 3-130705 and Japanese Patent Application Laid-Open No. SHO 57-24906. In the optical fiber connecting method disclosed in Japanese Patent Application Laid-Open No. HEI 3-130705, a first optical fiber having a larger core diameter and a smaller relative refractive index difference and a second optical fiber having a smaller core diameter and a greater relative refractive index difference are fusion-spliced together, and thus fusion-splice portion is heat-treated at a predetermined temperature the reafter. In the optical fiber connecting method disclosed in Japanese Patent Application Laid-Open No. SHO 57-24906, on the other hand, the first optical fiber whose core region has a higher refractive index is heat-treated more strongly than the second optical fiber after fusion splice. Both of the methods intend to diffuse dopants in any of the first and second optical fibers upon the heat treatment, so as to lower the difference in their core diameters, thus making it possible to decrease the splice loss at the fusion-splice portion.

Using these conventional optical fiber connecting method is supposed to lower the splice loss at the fusion-splice portion between the above-mentioned single-mode optical fiber and dispersion-compensating optical fiber to about 0.3 to 0.6 dB. It is also supposed that the splice loss at the fusion-splice portion between the above-mentioned positive and negative dispersion optical fibers can be lowered to about 0.3 dB.

DISCLOSURE OF THE INVENTION

However, the splice loss at the fusion-splice portion has not yet been considered small enough although it is somewhat reduced by the conventional techniques disclosed in the above-mentioned two publications.

The inventors of the present invention observed the glass state near the fusion-splice portion in fusion-spliced two optical fibers in detail. As a result of the observation, it has been seen that, when a standard single-mode optical fiber and a dispersion-compensating optical fiber are fusion-spliced, the core region in the dispersion-compensating optical fiber deforms as the mode-field diameter is smaller.

Based on the inventors findings mentioned above, for eliminating the aforesaid problems, it is an object of the present invention to provide an optical transmission line constituted by optical fibers having structures different from each other in which the connection loss at their fusion-splice portion is further lowered.

The optical transmission line in accordance with the present invention is an optical transmission line including a portion formed by fusion-splicing optical fibers having structures different from each other; wherein, in the optical fibers having structures different from each other, a first optical fiber has a mode field diameter smaller than a mode field diameter of a second optical fiber fusion-spliced thereto; and wherein the average viscosity from the center to the outermost layer in the first optical fiber is greater than the average viscosity from the center to the outermost layer in the second optical fiber.

When the average viscosities in the first and second optical fibers are set as such, the deformation of the core region of the first optical fiber having a smaller mode field diameter becomes smaller upon fusion splice, whereby the splice loss can be restrained from increasing due to changes in fiber structures.

Preferably, after the first and second optical fibers are fusion-spliced, the optical transmission line is heat-treated at the highest heating temperature of at least 1300° C. but not exceeding 1800° C. within a range having a length of at least 1 mm but less than 10 mm centered at the fusion-splice portion. In this case, the splice loss can further be reduced.

The first optical fiber may be one having at least two cladding region layers surrounding a core region, and the average viscosity of the outermost cladding region layer greater than that of the core region. In this case, the cladding region does not deform upon fusion splice in the first optical fiber, so that the core region is restrained from deforming upon heating, whereby the splice loss can be kept from increasing. Preferably, the first optical fiber has a core region doped with $GeO_2$ at a dopant concentration of at least 18 wt %, a first cladding region doped with F element, and an outermost cladding region layer doped with Cl element.

Preferably, the second optical fiber has at least one cladding region layer surrounding a core region, and the average viscosity of the outermost cladding region layer lower than any of the average viscosity of the core region and that of the outermost cladding region layer in the first optical fiber. In this case, no large structural changes occur in the core region in the second optical fiber even when its cladding softens upon fusion splice. Preferably, the second optical fiber has a core region doped with Cl element and a cladding region doped with F element. Alternatively, the second optical fiber may have two cladding region layers, the outer cladding region being doped with F element by an amount smaller than that in the inner cladding region.

Preferably, the core region of the second optical fiber has an outside diameter greater than the inside diameter of the outermost cladding region layer in the first optical fiber. In this case, the core region and first cladding region in the first optical fiber greatly influencing structural parameters thereof appear as if lidded with the core region of the second optical fiber, thus being surrounded with glass having a high viscosity, whereby their forms are easier to maintain.

Preferably, a part of the cladding region in the second optical fiber is doped with F element, whereas an outermost layer region thereof has an inside diameter of at least 1.05 times that of an outermost layer region in the first optical fiber.

A part of the cladding region of the second optical fiber may be doped with F element, the average viscosity of regions inside an outermost cladding region layer is greater than three times that of a region inside the outermost cladding region layer of the first optical fiber. Such setting can suppress the deformation of the region inside the outermost cladding region layer in the first optical fiber, whereby favorable connection characteristics can be obtained.

The first and second optical fibers may have unlike sign chromatic dispersions each other. Though the first and second optical fibers have mode field diameters greatly different from each other in general, the splice loss after fusion splice or after heat treatment can be made smaller in this case than in the conventional cases.

BRIEF DESCRIPTION OF THE DRAWINGS

FIG. 1A is a longitudinal sectional view for explaining the configuration of a fusion-splice portion in an optical transmission line in accordance with the present invention, whereas

FIGS. 2A to 2C are views for explaining refractive index profiles of optical fibers used in the optical transmission lines of FIGS. 1A and 1B;

FIG. 6 is a view showing another embodiment of the optical transmission line in accordance with the present invention, whereas FIGS. 8 and 9 are graphs each showing results of a comparative experiment, in which FIG. 8 is a graph plotting the splice loss of each sample after heat treatment with respect to the ratio between the core diameter of second optical fiber and the first cladding diameter of first optical fiber, whereas FIG. 9 is a graph plotting the splice loss of each sample after heat treatment with respect to the ratio between the average viscosity of the core region and first cladding region in first optical fiber and the viscosity of core region in second optical fiber.

BEST MODES FOR CARRYING OUT THE INVENTION

Figure 1A:
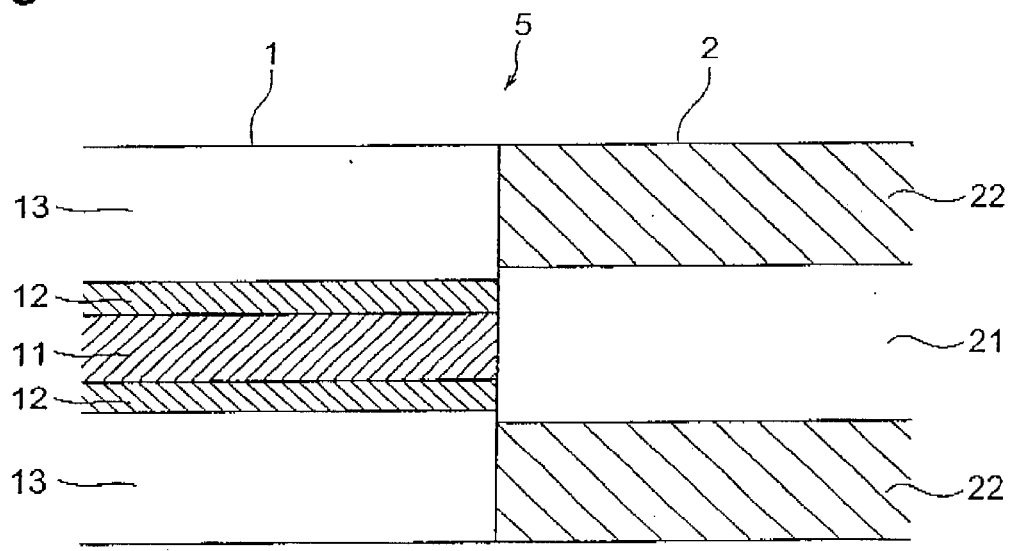

In the following, embodiments of the present invention will be explained in detail with reference to the accompanying drawings. To facilitate the comprehension of the explanation, the same reference numerals denote the same parts, where possible, throughout the drawings, and a repeated explanation will be omitted.

Figure 1B:
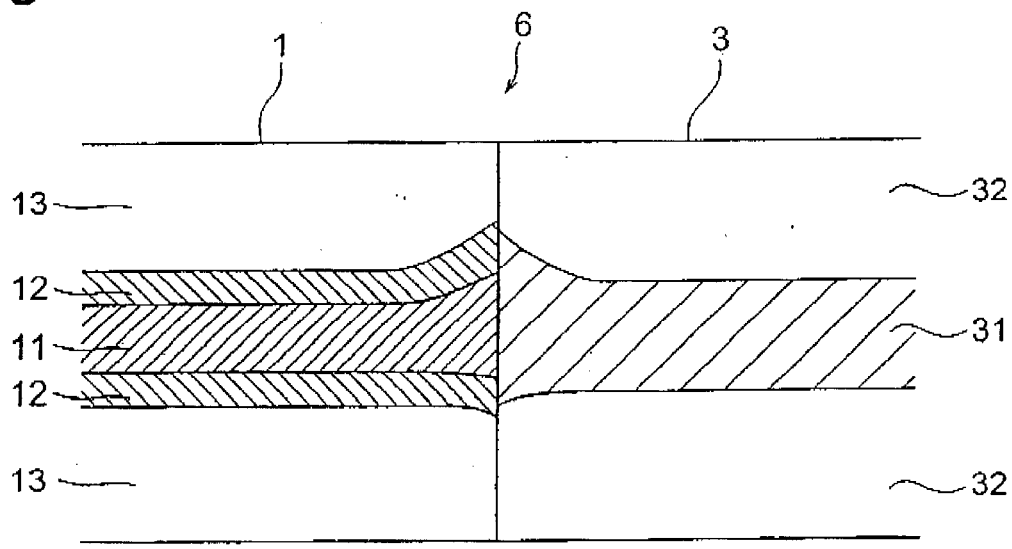
FIG. 1B is a longitudinal sectional view for explaining the configuration, of a fusion-splice portion in a conventional optical transmission line.

FIG. 1A is a longitudinal sectional view showing a connecting portion of different kinds of optical fibers in a preferred embodiment of optical transmission line 5 in accordance with the present invention, whereas FIG. 1B is a longitudinal sectional view showing a splice portion of a conventional optical transmission line 6 for comparison.

Fusion-splice in the optical transmission line 5 of this embodiment are an optical fiber 1 which is a dispersion-compensating optical fiber having a negative chromatic dispersion at a wavelength of 1.55 μm; and an optical fiber 2 which is a single-mode optical fiber, having a zero-dispersion wavelength in a 1.3-μm wavelength band and a positive chromatic dispersion at a wavelength of 1.55 μm, for an optical transmission line. FIGS. 2A and 2B show respective refractive index profiles of optical fibers 1 and 2.

Figure 3:
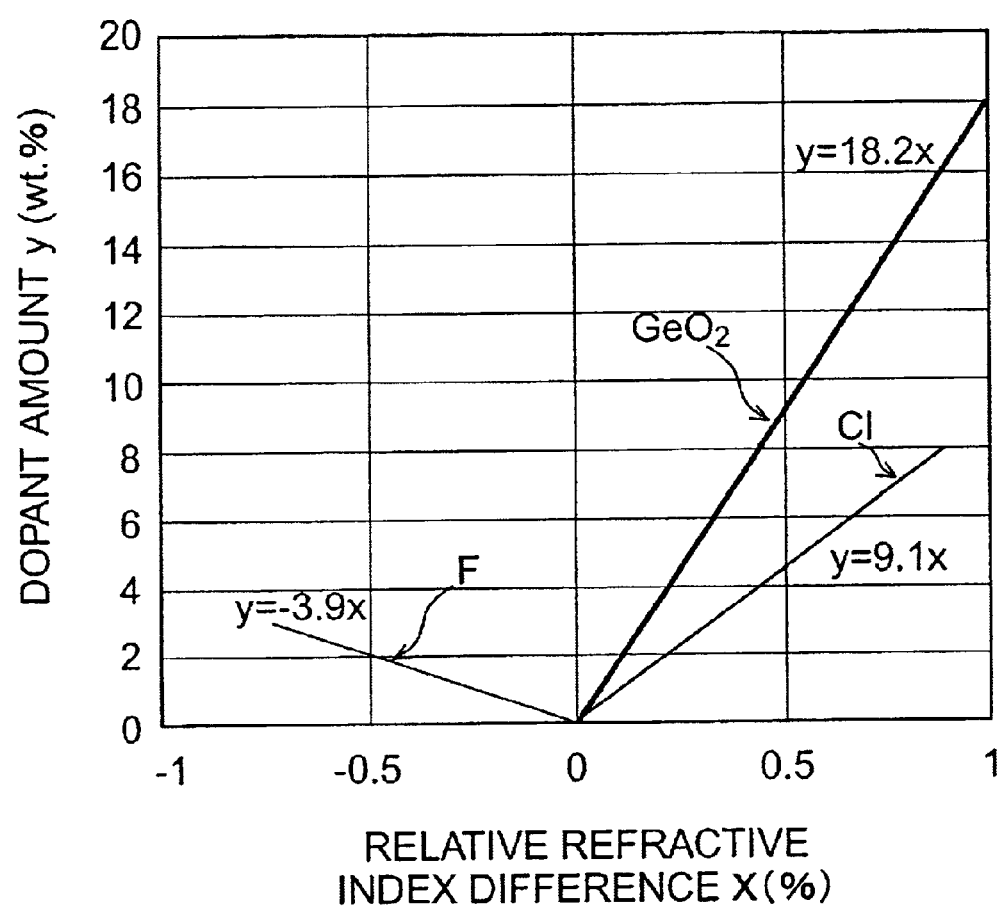
FIG. 3 is a graph showing relationships between concentrations of various dopants (GeO$_2$, Cl element, and F element) in an optical fiber and its relative refractive index difference.

As shown in FIGS. 1A and 2A, the optical fiber 1 is an optical fiber having a so-called double cladding, and comprises, successively from its center, a core region 11 having a maximum refractive index $n_{11}$ and an outside diameter $2a_1$, a first cladding region 12 having a refractive index $n_2$ and an outside diameter $2b_1$, and a second cladding 13 having a refractive index $n_{13}$, in which the individual refractive indices are set to $n_{11} > n_{13} > n_{12}$ in terms of the relationship of magnitude. While the optical fiber 1 is silica glass based, the core region 11 is doped with a high concentration of germanium dioxide (GeO$_2$), and the first cladding region 12 is doped with fluorine (F). The second cladding region 13 is a substantially pure silica glass or doped with about 0.5 wt % to 1.0 wt % of chlorine (Cl). Preferably, the relative refractive index difference $\Delta_{11}$ of core region 11 with reference to the refractive index $n_{13}$ of second cladding region 13 is at least 1%. FIG. 3 is a graph showing relationships between concentrations of various dopants (GeO$_2$, Cl element, and F element) and relative refractive index difference, from which it is seen that the dopant concentration of GeO$_2$ is at least 18 wt % for realizing the relative refractive index difference $\Delta_{11}$ of core region 11 when the second cladding region 13 is pure silica glass.

Figure 4:
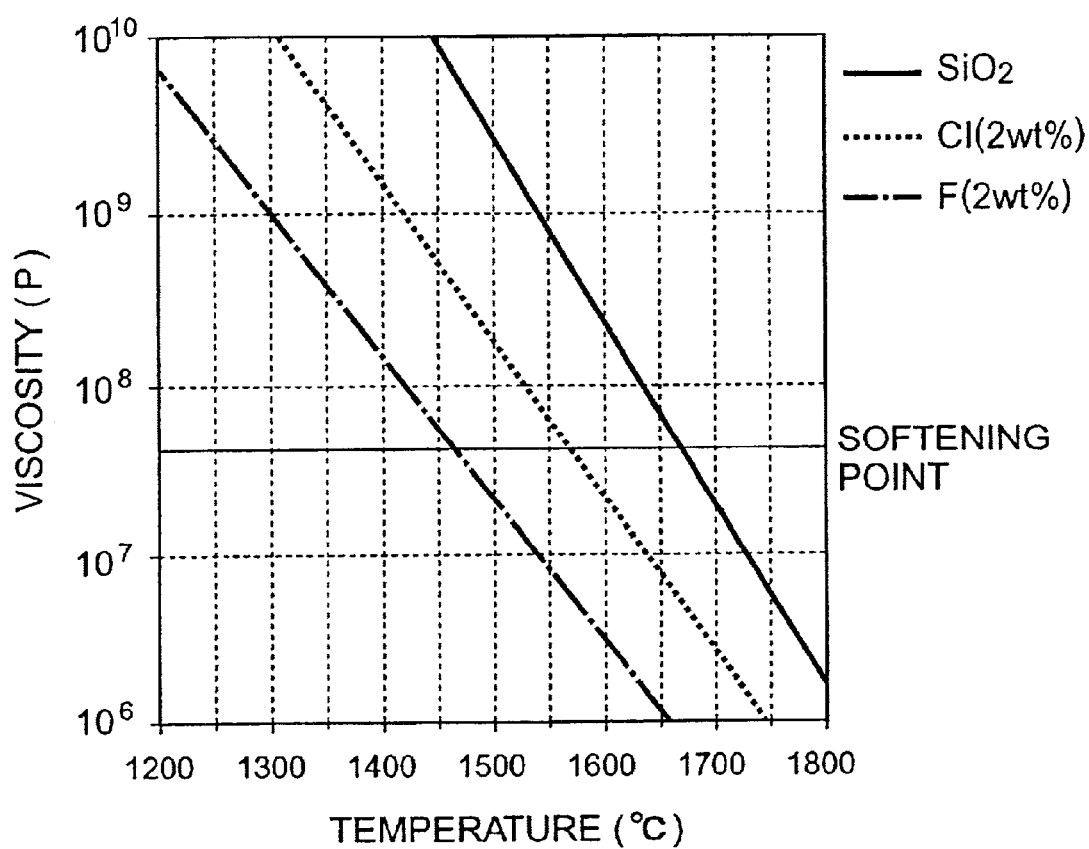
FIG. 4 is a graph showing the relationship between viscosity and temperature in each of pure silica (SiO$_2$) glass, silica glass doped with 2 wt % of Cl element, and silica glass doped with 2 wt % of F element.
Figure 5:
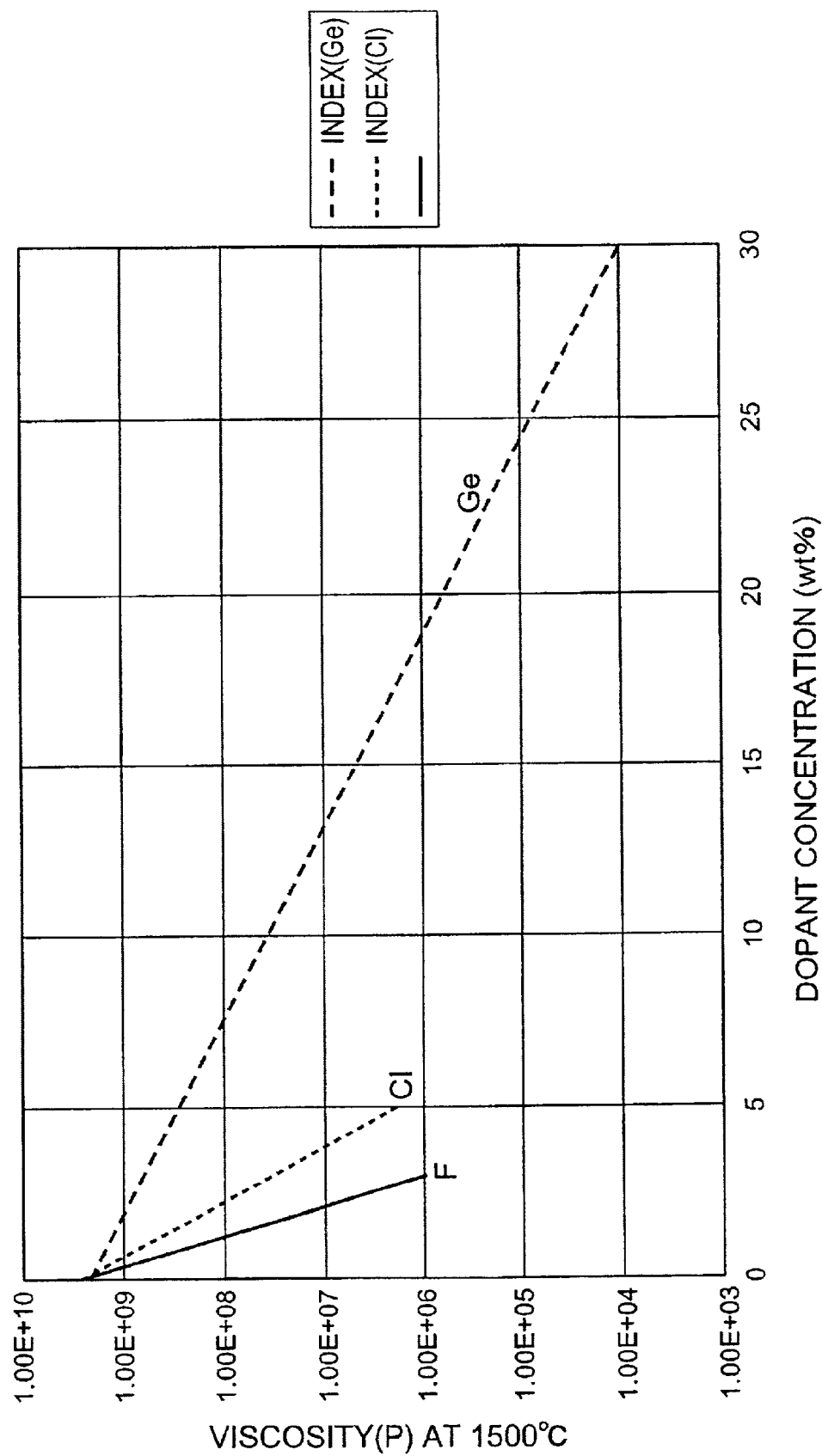
FIG. 5 is a graph showing the relationship between viscosity and temperature in each of various dopants at 1500° C.

When such setting is made, respective viscosities $\eta_{11}$, $\eta_{12}$, $\eta_{13}$ of the individual regions 11 to 13 within the optical fiber 1 satisfy the relationship of $\eta_{11} < \eta_{12} < \eta_{13}$. FIG. 4 is a graph showing the relationship between viscosity and temperature in each of pure silica (SiO$_2$) glass, silica glass doped with 2 wt % of Cl element, and silica glass doped with 2 wt % of F element. In general, as can be seen from this graph, the viscosity of silica glass decreases when any of substantially all the other elements or oxides is added thereto. Also, its viscosity has a property of decreasing as the temperature rises regardless of whether dopants exist or not. FIG. 5 is a graph showing the relationship between dopant concentration and viscosity at 1500° C. for each of three dopants of $GeO_2$, Cl, and F. At the same dopant amount (wt %), the decrease in viscosity is the largest when doped with F element, and the smallest when doped with $GeO_2$. Since the core region 11 is doped with a large amount of $GeO_2$ in this embodiment, however, its viscosity $\eta_{11}$ is lower than the viscosity $\eta_{12}$ of the first cladding region 12 doped with F element, whereas the viscosity $\eta_{13}$ of the second cladding region 13 doped with no additive or only a minute amount of Cl element is the highest.

On the other hand, as shown in FIGS. 1A and 2B, the optical fiber 2 comprises, successively from its center, a core region 21 having a maximum refractive index $n_{21}$ and an outside diameter $2a_2$, and a cladding region 22 having a refractive index $n_{22}$, whereas the individual refractive indices are set so as to have the relationship of $n_{21} > n_{22}$. The optical fiber 2 is based on silica glass, whereas the core region 21 is substantially pure silica glass or doped with about 0.5 wt % to 1.0 wt % of Cl element. The cladding region 22 is doped with F element. As a result, the viscosity $\eta_{22}$ of cladding region 22 is lower than the viscosity $\eta_{21}$ of core region 21, and lower than the viscosity $\eta_{13}$ of second cladding region 13 of optical fiber 1 (see FIG. 4). The optical fiber 2 has a low transmission loss since the dopant concentration of core region 21 is low, and is excellent in hydrogen- and radiation-resistant characteristics since the cladding region 22 is doped with F element, whereby it is an optical fiber suitably used for undersea cables.

Exemplified here is a case where each of the second cladding region 13 of optical fiber 1 and the core region 21 of optical fiber 2 is pure silica glass, and both regions have the same refractive index level (i.e., $n_{13} = n_{21}$ holds). Of course, one or both of them may be doped with Cl element, and refractive index levels in both regions may differ from each other.

Letting the respective average viscosities of optical fibers 1, 2 be $\eta_1$, $\eta_2$, the relationship of $\eta_1 > \eta_2$ holds. Here, assuming that the optical fiber is composed of n layers, the average viscosity $\eta_i$ of optical fiber i as a whole can be represented by the following expression:

$$\eta_i = \sum_{j=1}^{n} \eta_{ij} \times \frac{S_{ij}}{S_i}$$

where $\eta_{ij}$ is the viscosity of its j-th layer ($1 \leq j \leq n$), $S_{ij}$ is the cross-sectional area thereof, and $S_i$ is the total cross-sectional area.

When thus set optical fibers 1 and 2 are fusion-spliced, the respective core regions 11, 21 of optical fibers 1 and 2 can be restrained from deforming near the fusion-splice portion. This is because of the fact that the core region 11 and first cladding region 12 having a lower viscosity in the optical fiber 1 are surrounded by the second cladding region having a higher viscosity, and their end face at the fusion-splice portion is in a state blocked by the core region 21 having a higher viscosity in the optical fiber 2, whereby each of them can be restrained from deforming.

When thus set optical fibers 1 and 2, which are a dispersion-compensating optical fiber and a single-mode optical fiber, respectively, are connected so as to form an optical transmission line, it is possible to construct an optical transmission line whose average chromatic dispersion and splice loss are so small that it is suitably used in a wavelength division multiplexing transmission system.

Preferably, heat treatment is carried out for thermal diffusion of dopants after fusion splice. This heat treatment can further lower the splice loss. A preferred condition for this heat treatment comprises a heating range with a heating length of at least 1 mm but less than 10 mm centered at the fusion-splice portion, and a maximum heating temperature of at least 1300° C. but less than 1800° C. The heating temperature is selected within a temperature range in which the optical fibers 1, 2 are not deformed while the dopants can thermally diffuse.

The optical transmission line 6 of a conventional product shown in FIG. 1B, by contrast, uses an optical fiber 3 as a single-mode optical fiber. As indicated by the refractive index profile shown in FIG. 2C, this optical fiber 3 comprises, successively from its center, a core region 31 having a maximum refractive index $n_{31}$ and an outside diameter $2a_3$, and a cladding region 32 having a refractive index $n_{32}$, whereas the individual refractive indices have the relationship of $n_{31} > n_{32}$ in terms of magnitude. While the optical fiber 3 is based on silica glass, the core region 31 is doped with $GeO_2$, and the cladding region 32 is substantially pure silica glass. As a result, respective viscosities $\eta_{31}$, $\eta_{32}$ of the individual regions have the relationship of $\eta_{31} < \eta_{32}$.

When such an optical fibers 3 and the optical fiber 1 are fusion-spliced, these optical fibers deform at their butting portions since they have a low viscosity at their center regions and both of them are easy to deform, whereby the core regions 11, 31 and inner cladding region 12 at their connecting portion increase their diameters as shown in FIG. 1B.

In the optical fiber 1 having a smaller mode field diameter, in particular, even a minute change in the structure of core region alters the mode field diameter greatly. The splice loss is supposed to have increased in the conventional product due to such a reason. By contrast, the optical transmission line 5 of this embodiment has a structure for restraining the first optical fiber 1 having a smaller mode field diameter from deforming at the connecting end face upon fusion splice, so that the occurrence of fluctuation in mode field diameter can be suppressed, whereby splice loss can be prevented from increasing.

Though one having the refractive index profile shown in FIG. 2A is assumed as the first optical fiber 1 having a smaller mode field diameter in this embodiment, the refractive index profile of first optical fiber 1 is not restricted thereto. More in general, preferable as the first optical fiber 1 is one having at least two cladding region layers, in which the outermost cladding region layer has a viscosity higher than that of the core region. Because of such a configuration, the cladding region does not deform upon fusion splice in the optical fiber 1, whereby the core region is restrained from deforming upon heating.

Though one having the refractive index profile shown in FIG. 2B is assumed as the second optical fiber 2 having a larger mode field diameter in this embodiment, the refractive index profile of second optical fiber 2 is not restricted thereto. More in general, preferable as the second optical fiber 2 is one having at least one cladding region layer, in which the outermost cladding region layer has a viscosity lower than that of the core region. Further preferable as the second optical fiber 2 is one in which the outermost cladding region layer has a viscosity lower than that of the cladding region of first optical fiber 1. Because of such a configuration, no structural changes occur in the core region of the optical fiber 2 even when the cladding softens upon fusion splice.

Preferably, the core region 21 of the optical fiber 2 having a larger mode field diameter has an outside diameter larger than that of the first cladding region 12 of the optical fiber 1 having a smaller mode field diameter. Because of such a configuration, the core region 11 and first cladding region 12 heavily influential to structural parameters of the optical fiber 1 are in a state as if lidded with the core region 21 of optical fiber 2, so as to be surrounded with glass having a high viscosity, whereby their forms can be maintained. Since the forms of core region 11 and first cladding region 12 are maintained in the optical fiber 1, the splice loss becomes lower.

Preferably, in this case, the core region 21 of second optical fiber has an average viscosity higher than that of the core region 11 and first cladding region 12 in the first optical fiber. Here, the average viscosity $\eta_{ave}$ of the core region 11 and first cladding region 12 in the optical fiber 1 can be represented by the following expression:

$$\eta_{ave} = \frac{\eta_a \times S_a + \eta_b \times S_b}{S_a + S_b}$$

where $\eta_a$ is the viscosity of the core portion, $\eta_b$ is the viscosity of the cladding region, and $S_a$ and $S_b$ are their respective cross-sectional areas.

Such setting reliably yields the effect of lidding with the core region 21 of second optical fiber.

Figure 6:
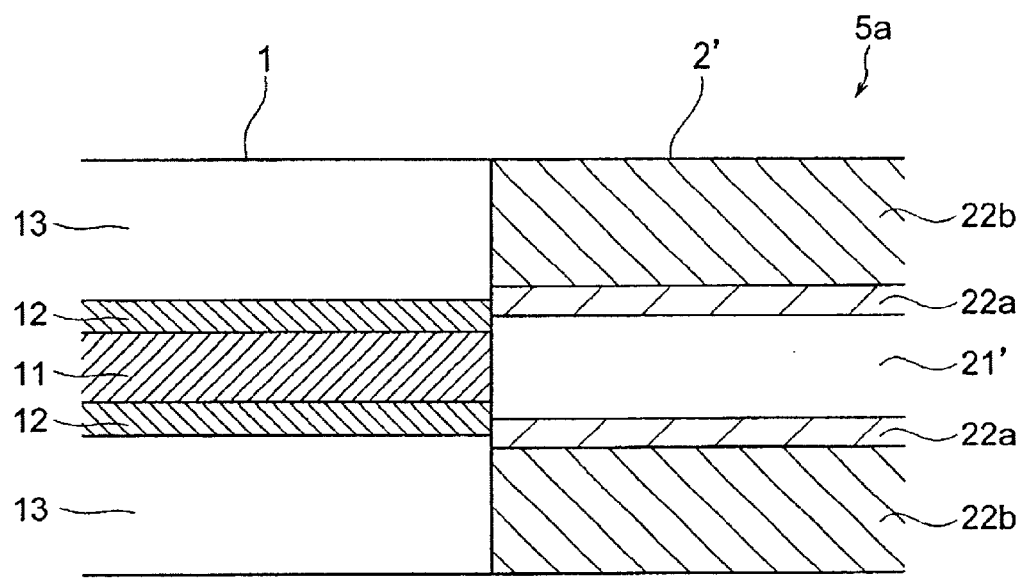
Figure 7:
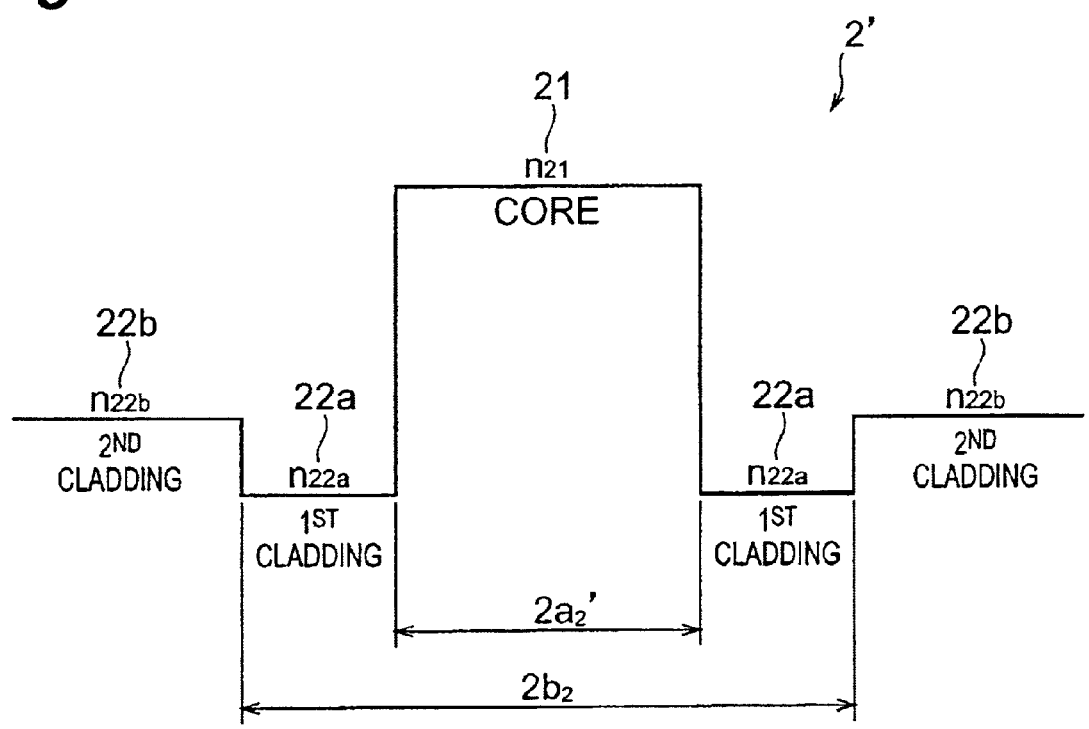
FIG. 7 is a view for explaining the refractive index profile of a second optical fiber used in this embodiment.

FIG. 6 is a view showing a second embodiment of the optical transmission line in accordance with the present invention. The optical transmission line 5a of this embodiment differs from the optical transmission line 5 of the first embodiment in that its second optical fiber 2' has a double cladding structure. FIG. 7 is a view for explaining the refractive index profile of the second optical fiber 2'. As shown in FIGS. 6 and 7, the second optical fiber 2' comprises, successively from its center, a core region 21 having a refractive index $n_{21}$ and an outside diameter $2a_2'$, a first cladding region 22a having a refractive index $n_{22}a$ and an outside diameter $2b_2'$, and a second cladding region 22b having a refractive index $n_{22b}$, whereas the individual refractive indices are set so as to have the relationship of $n_{21} > n_{22b} > n_{22a}$. While the optical fiber 2 is based on silica glass, the core region 21 is substantially pure silica glass or doped with about 0.5 wt % to 1.0 wt % of Cl element. Each of the two cladding regions 22a, 22b is doped with F element, whereas the first cladding region 22a has a dopant concentration higher than that in the second cladding region 22b. As a result, each of the viscosities $\eta_{22a}$, $\eta_{22b}$ of cladding region 22 is smaller than the viscosity $\eta_{21}$ of core region 21, and is smaller than the viscosity $\eta_{13}$ of second cladding 13 of first optical fiber 1 (see FIG. 4). Effects similar to those of the first embodiment can be achieved in this case as well.

Examples and Comparative Examples

In order to verify the effects of splice loss reduction in the optical transmission line in accordance with the present invention, the inventors prepared several kinds of samples and carried out experiments for comparing them with conventional optical transmission line samples. The results of experiments will now be explained.

Tables 1 to 4 shown in the following are charts summarizing the optical fiber structures of individual samples (identified by case numbers), indicating 13 kinds of samples. Here, cases 1 to 3 are structural examples of conventional products, i.e., comparative examples, whereas cases 4 to 13 are examples of the optical transmission line in accordance with the present invention.

TABLE 1

Structure of First Optical Fiber

| Case No. | Core outside diameter (μm) | 1st cladding outside diameter (μm) | 2nd cladding outside diameter (μm) |
|---|---|---|---|
| 1 | 4.0 | 8.0 | 122 |
| 2 | 3.9 | 7.0 | 120 |
| 3 | 4.2 | 8.0 | 125 |
| 4 | | | |
| 5 | | | |
| 6 | | | |
| 7 | 4.3 | 9.0 | 128 |
| 8 | 4.2 | 8.0 | 126 |
| 9 | 4.1 | 7.0 | 124 |
| 10 | 4.675 | 8.5 | 126 |
| 11 | 5.225 | 9.5 | 128 |
| 12 | 5.775 | 10.5 | 130 |
| 13 | 4.0 | 8.0 | 123 |

TABLE 2

Dopant Concentration and Refractive Index Characteristic of First Optical Fiber

| Case No. | Core dopant conc. (wt %) | Δn1 (%) | 1st cladding dopant conc. (wt %) | Δn2 (%) | 2nd cladding dopant conc. (wt %) | Δn3 (%) |
|---|---|---|---|---|---|---|
| 1 | 30.94 | 1.70 | 1.365 | −0.35 | 0.00 | 0.00 |
| 2 | 27.30 | 1.50 | | | | |
| 3 | 26.39 | 1.45 | 1.56 | −0.40 | 0.20 | 0.022 |
| 4 | | | | | | |
| 5 | | | | | | |
| 6 | | | | | | |
| 7 | 25.48 | 1.40 | 1.17 | −0.30 | 0.455 | 0.05 |
| 8 | | | | | | |
| 9 | | | | | | |
| 10 | 27.30 | 1.50 | 1.56 | −0.40 | | |
| 11 | | | | | | |
| 12 | | | | | | |
| 13 | | | | | | |

As can be seen from Tables 1 and 2, the first optical fiber with a smaller mode field diameter (MFD) in each case has the refractive index and structure shown in FIG. 2A, in which the core region is silica glass doped with GeO$_2$, whereas the fist cladding region is silica glass doped with element. The second cladding region is substantially pure silica glass in cases 1 to 6, and silica glass doped with Cl element in cases 7 to 13. The outside diameter of first cladding region is within the range of 7 μm to 9 μm in cases 1 to 10 and 13, and exceeds 9 μm and thus is large in cases 11 and 12. In Table 2, each relative refractive index difference is based on the relative refractive index difference of pure silica glass.

TABLE 3

Structure of Second Optical Fiber

| Case No. | Structure | Core outside diameter (μm) | Core dopant |
|---|---|---|---|
| 1 | 3 | 7.5 | $GeO_2$ |
| 2 | | | |
| 3 | | 6.0 | |
| 4 | 2 | 11.0 | none |
| 5 | | 7.0 | |
| 6 | | 9.0 | Cl |
| 7 | | 11.0 | |
| 8 | | 12.0 | |
| 9 | | 9.0 | |
| 10 | | 9.5 | |
| 11 | | 8.5 | |
| 12 | | 7.5 | |
| 13 | 2' | 12.0 | |

TABLE 4

Dopant Concentration and Refractive Index Characteristic of Second Optical Fiber

| Case No. | Core dopant conc. (wt %) | Δn1 (%) | 1st cladding dopant conc. (wt %) | Δn2 (%) | 2nd cladding dopant conc. (wt %) | Δn3 (%) |
|---|---|---|---|---|---|---|
| 1 | 6.188 | 0.34 | 0.0 | 0.0 | — | — |
| 2 | | | | | | |
| 3 | 10.01 | 0.55 | 0.195 | −0.05 | | |
| 4 | 0.0 | 0.0 | 1.248 | −0.32 | | |
| 5 | | | | | | |
| 6 | 0.455 | 0.05 | 0.975 | −0.25 | | |
| 7 | | | | | | |
| 8 | | | | | | |
| 9 | 0.637 | 0.07 | 1.092 | −0.28 | | |
| 11 | | | | | | |
| 12 | | | | | | |
| 13 | | | | | 0.78 | −0.2 |

The numbers listed in the column of structure in Table 3 indicate which structures of optical fibers shown in FIGS. 1A, 1B, and 6 are used as the second optical fiber. Namely, employed in cases 1 to 3 are those having the refractive index profile shown in FIG. 2C, in which the core region is silica glass doped with $GeO_2$, whereas the cladding region is substantially pure silica glass (in cases 1 and 2) or silica glass doped with F element (in case 3). Employed as the second optical fiber in cases 4 to 12 are those having the refractive index profile shown in FIG. 2B, in which the core region is substantially pure silica glass (in cases 4 and 5) or silica glass doped with Cl element (in cases 6 to 12), whereas the cladding region is silica glass doped with F element. In case 13, the second optical fiber is one having the refractive index profile shown in FIG. 7, in which the core region is silica glass doped with Cl element, whereas the first and second cladding regions are made of silica glass doped with F element. The outside diameter of core region of second optical fiber is within the range of 6.0 to 12.0 μm in each case. The outside diameter of second optical fiber is 125 μm in each case, whereas the outside diameter of first cladding in the second optical fiber employed in case 13 is set to 50 μm.

Table 5 shows the respective mode field diameters (MFD) of first and second optical fibers, respective total average viscosities $\eta_1$, $\eta_2$ thereof, average viscosity $\eta_{1c}$ of the core region and first cladding region of first optical fiber, viscosity $\eta_{2c}$ of the core region of second optical fiber, and results of comparison of splice losses after fusion and after the above-mentioned predetermined heat treatment when these optical fibers are fusion-spliced together are compared with each other.

TABLE 5

Comparison of Characteristics of First and Second Optical Fibers and Comparison of Splice Loss

| | 1st optical fiber | | | 2nd optical fiber | | | splice loss | |
|---|---|---|---|---|---|---|---|---|
| Case No. | MFD (μm) | $\eta_1$ ($\times 10^8$P) | $\eta_{1c}$ | MFD (μm) | $\eta_2$ ($\times 10^8$P) | $\eta_{2c}$ | after fusion splice (dB) | after heating (dB) |
| 1 | 4.5 | 30 | 2.08 | 10.3 | 30 | 1.545 | 1.5 | 1.0 |
| 2 | 5.0 | | 1.91 | | | | 1.6 | 0.9 |
| 3 | 5.1 | 17 | 1.52 | 8.2 | 18 | 0.3178 | 1.0 | 0.6 |
| 4 | | | | 11.5 | 1.3 | 30.0 | 0.5 | 0.2 |
| 5 | | | | 10.5 | 1.1 | 30.0 | 0.8 | 0.3 |
| 6 | | | | 11.1 | 2.2 | 10.36 | 0.6 | 0.2 |
| 7 | 4.9 | 8.8 | 2.84 | 11.7 | 2.3 | | 0.4 | 0.15 |
| 8 | 5.2 | | 2.67 | 12.1 | | | 0.35 | 0.11 |
| 9 | 5.2 | | 2.42 | 10.3 | 1.6 | 7.958 | 0.35 | 0.12 |
| 10 | 5.0 | | 2.57 | 10.5 | | | 0.4 | 0.15 |
| 11 | 4.8 | | | 10.2 | | | 0.45 | 0.3 |
| 12 | 4.7 | | | 10.0 | | | 0.55 | 0.4 |
| 13 | 4.9 | | 1.57 | 12.0 | 3.4 | | 0.70 | 0.2 |

A necessary condition in the optical transmission line in accordance with the present invention is that the optical fiber with a smaller MFD has an average viscosity higher than that of the optical fiber having a larger MFD; cases 4 to 13, which are examples, satisfy this condition of $\eta_1 > \eta_2$. The splice loss after fusion splice was 1.0 dB or greater in cases 1 to 3 which are comparative examples, and was within the range of 0.35 to 0.8 dB in cases 4 to 13 which are examples. In each case, the splice loss after heat treatment was smaller than that after fusion splice. Though the splice loss after heat treatment was still 0.6 dB or greater in cases 1 to 3 which are comparative examples, it was 0.4 dB or less in cases 4 to 13 which are examples and within the range of 0.11 to 0.3 dB in examples excluding case 12.

As in the foregoing, while the splice loss after fusion splice was about 1.0 to 2.0 dB in the prior art, it was allowed to decrease to about 0.35 to 0.8 dB by use of the optical fiber connecting method in accordance with this embodiment. Also, while the splice loss after heat treatment was about 0.3 to 0.6 dB in the prior art, it was allowed to decrease to about 0.11 to 0.3 dB by use of the optical fiber connecting method in accordance with this embodiment.

Figure 8:
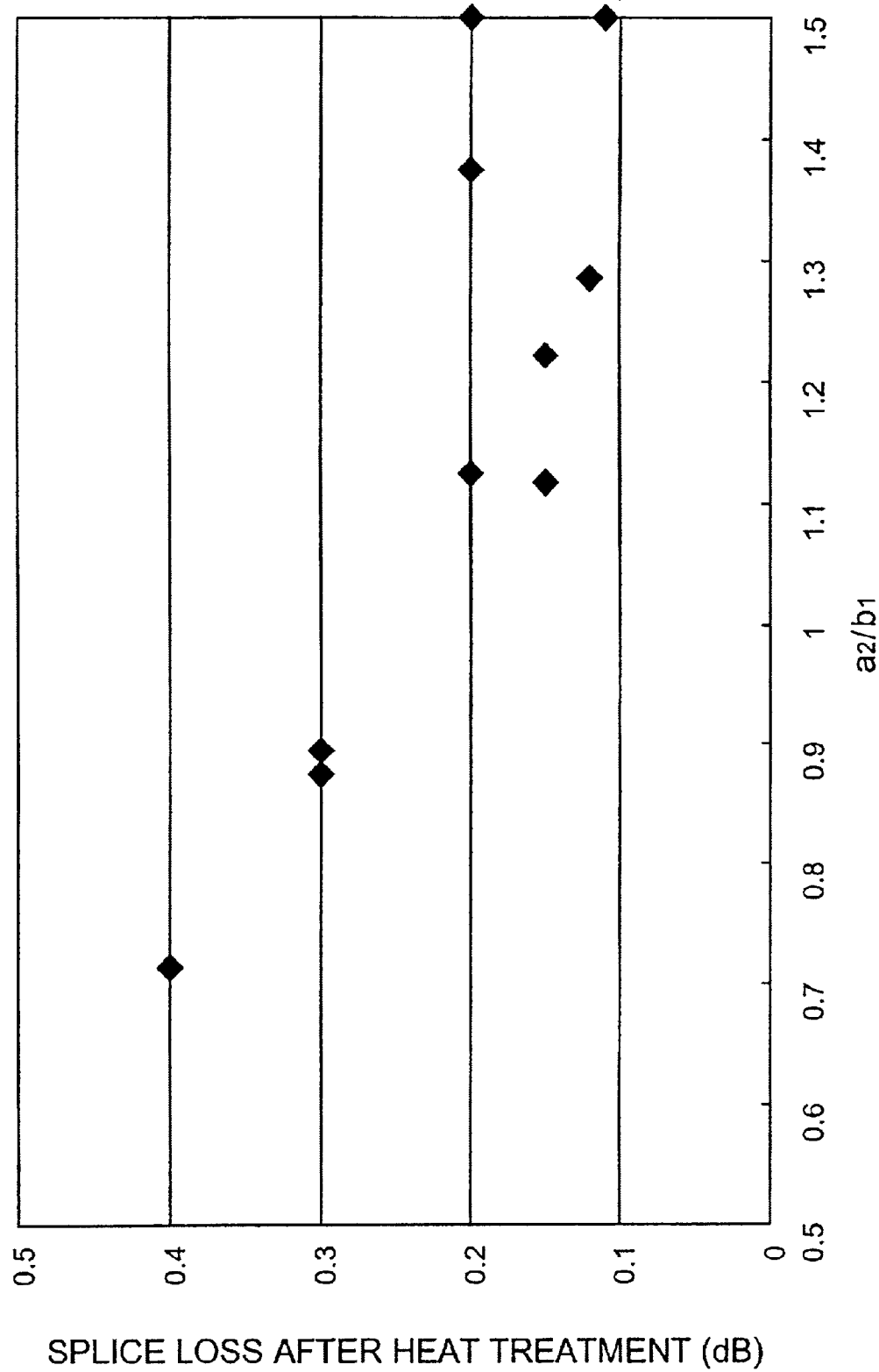

In particular, among those in accordance with this embodiment, cases 4, 6 to 10, and 13 in which the core of second optical fiber has an outside diameter larger than the outside diameter of first cladding yielded a splice loss of 0.3 dB or less which was small. In cases 7 to 10 among them, the splice loss was 0.15 dB or less and was particularly small. FIG. 8 is a graph plotting the splice loss after heat treatment with respect to the ratio $a_2/b_1$ of the outside diameter $2a_2$ of core region in the second optical fiber to the outside diameter $2b_1$ of first cladding in the first optical fiber. This graph indicates it preferable to set $a_2/b_1$ to at least 1.05, i.e., set the outside diameter of core region in the second optical fiber to at least 1.05 times that of the first cladding region in the first optical fiber, since the splice loss after heat treatment can be suppressed to 0.2 dB or less thereby. This is because of the fact that, in such setting, the core and inner cladding region of first optical fiber, which are easier to deform upon fusion splice, are covered with the harder core portion of second optical fiber, whereby their deforming is suppressed. In the case where the first optical fiber has a structure made of four or more layers, it is preferred that the core diameter of second optical fiber be set to the inside diameter of outermost layer of first optical fiber or greater.

Figure 9:
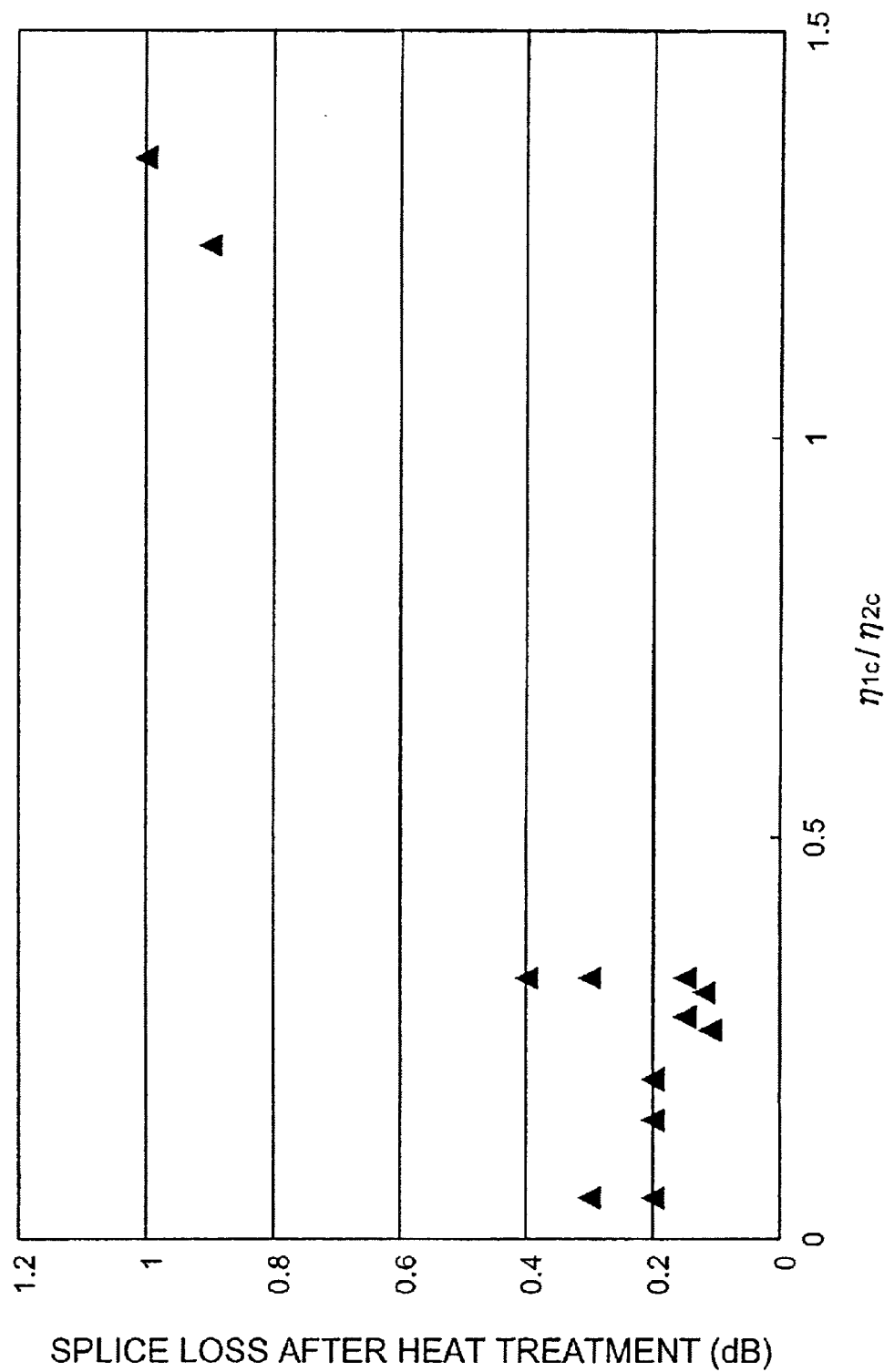

FIG. 9 is a graph plotting the splice loss of each sample after heat treatment with respect to the ratio $\eta_{1c}/\eta_{2c}$ of the average viscosity $\eta_{1c}$ of the core and first cladding region of first optical fiber and the viscosity $\eta_{2c}$ of core region of second optical fiber. It has been seen that, if $\eta 1c/\eta_{2c}$ is 1/3 or less, i.e., $\eta_{2c}$ is at least three times as much as $\eta_{1c}$, then the splice loss after heat treatment becomes 0.4 dB or less, whereby favorable characteristics can be exhibited.

Without being restricted to the above-mentioned embodiments, the present invention can be modified in various manners. Though the above-mentioned embodiments explain an optical transmission line in which a single-mode optical fiber (second optical fiber) having a zero-dispersion wavelength in a 1.3-μm wavelength band and a positive chromatic dispersion at a wavelength of 1.55 μm and a dispersion-compensating optical fiber (first optical fiber) having a negative chromatic dispersion at a wavelength of 1.55 μm are fusion-spliced, so as to compensate for chromatic dispersion, the present invention is not restricted thereto. For example, the present invention is also suitably employed for restraining transmission characteristics from deteriorating due to four-wave mixing and chromatic dispersion in an optical transmission line in which positive and negative dispersion optical fibers respectively having positive and negative chromatic dispersions at a predetermined wavelength are alternately fusion-spliced.

INDUSTRIAL APPLICABILITY

The present invention is suitably applicable to an optical transmission line including a portion in which optical fibers having structures and characteristics di different from each other are fusion-spliced for suppressing chromatic dispersion and restraining transmission characteristics from deteriorating due to four-wave mixing and chromatic dispersion.

What is claimed is:

1. An optical transmission line including a fusion-spliced portion formed by fusion-splicing optical fibers having structures different from each other, wherein the fusion spliced portion comprises:

a first optical fiber having a mode field diameter, a geometric center, an outermost layer, and an average viscosity; and a second optical fiber fusion-spliced, having a mode field diameter greater than the mode field diameter of the first optical fiber, a geometric center, an outermost layer, and an average viscosity, wherein the average viscosity from the geometric center to the outermost layer in said first optical fiber is greater than the average viscosity from the geometric center to the outermost layer in said second optical fiber.

2. The optical transmission line according to claim 1, wherein, after said first and second optical fibers are fusion-spliced, said optical transmission line is heat-treated at the highest heating temperature of at least 1300° C. but not exceeding 1800° C. within a range having a length of at least 1 mm but less than 10 mm centered at said fusion-splice portion.

3. The optical transmission line according to claim 1, wherein said first optical fiber has at least two cladding region layers surrounding a core region, and the average viscosity of the outermost cladding region layer is greater than the average viscosity of said core region, and wherein the outermost cladding region layer of said first optical fiber coincides with the outermost layer of said first optical fiber.

4. The optical transmission line according to claim 3, wherein said core region of said first optical fiber is doped with $GeO_2$ at a dopant concentration of at least 18 wt %, the first cladding region is doped with F element, and the outermost cladding region layer is doped with Cl element.

5. The optical transmission line according to claim 3, wherein said core region of said second optical fiber has an outside diameter greater than the inside diameter of said outermost cladding region layer in said first optical fiber.

6. The optical transmission line according to claim 5, wherein a part of cladding region in said second optical fiber is doped with F element, said core region thereof has an outside diameter of at least 1.05 times the inside diameter of said outermost layer region in said first optical fiber.

7. The optical transmission line according to claim 5, wherein a part of cladding region in said second optical fiber is doped with F element, said core region thereof has a viscosity greater than three times the average viscosity of a region inside said outermost cladding region layer in said first optical fiber.

8. The optical transmission line according to claim 1, wherein said second optical fiber has at least one cladding region layer surrounding a core region, and the average viscosity of the outermost cladding region layer in said second optical fiber is lower than the average viscosity of said core region in said second optical fiber and lower than the average viscosity of the outermost cladding region layer in said first optical fiber.

9. The optical transmission line according to claim 1, wherein said second optical fiber has a core region doped with Cl element and a cladding region doped with F element.

10. The optical transmission line according to claim 9, wherein said second optical fiber has two cladding region layers, the outer cladding region layer being doped with F element by an amount smaller than that in the inner cladding region layer, and the outer cladding region layer of said second optical fiber coincides with the outermost layer of said second optical fiber.

11. The optical transmission line according to claim 1, wherein said first and second optical fibers have unlike sign chromatic dispersions.

* * * * *